United States Patent
Huang et al.

(10) Patent No.: US 9,336,583 B2
(45) Date of Patent: May 10, 2016

(54) SYSTEMS AND METHODS FOR IMAGE EDITING

(71) Applicant: Cyberlink Corp., Shindian, Taipei (TW)

(72) Inventors: Ho-Chao Huang, New Taipei (TW); Huan-Wen Hsiao, Chiayi (TW); Chung-Yi Weng, Taichung (TW); Cheng-da Chung, New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 95 days.

(21) Appl. No.: 14/258,261

(22) Filed: Apr. 22, 2014

(65) Prior Publication Data

US 2014/0369627 A1  Dec. 18, 2014

Related U.S. Application Data

(60) Provisional application No. 61/835,726, filed on Jun. 17, 2013.

(51) Int. Cl.
*G06T 5/50* (2006.01)
*G06K 9/00* (2006.01)
*G06T 5/00* (2006.01)
*G06T 11/60* (2006.01)

(52) U.S. Cl.
CPC .............. *G06T 5/50* (2013.01); *G06K 9/00281* (2013.01); *G06K 9/00315* (2013.01); *G06T 5/005* (2013.01); *G06T 11/60* (2013.01); *G06T 2207/10016* (2013.01); *G06T 2207/20212* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 7,456,874 | B1* | 11/2008 | Ono | G03B 19/02 348/218.1 |
| 7,659,923 | B1* | 2/2010 | Johnson | G03B 17/00 348/218.1 |
| 8,135,184 | B2 | 3/2012 | Steinberg et al. | |
| 2010/0066840 | A1* | 3/2010 | Asukai | G06T 5/50 348/207.1 |
| 2010/0302394 | A1* | 12/2010 | Srinivasa Rao | H04N 5/232 348/222.1 |
| 2011/0013038 | A1* | 1/2011 | Kim | G06K 9/00228 348/222.1 |
| 2011/0268369 | A1* | 11/2011 | Richards | G06T 5/005 382/284 |
| 2012/0120269 | A1 | 5/2012 | Capata et al. | |

OTHER PUBLICATIONS

Bitouk, Dmitri, et al. "Face swapping: automatically replacing faces in photographs." ACM Transactions on Graphics (TOG) 27.3 (2008): 39.*
Bitouk et al. "Face Swapping: Automatically Replacing Faces in Photographs" May 6, 2008.

* cited by examiner

*Primary Examiner* — Bhavesh Mehta
*Assistant Examiner* — Narek Zohrabyan
(74) *Attorney, Agent, or Firm* — McClure, Qualey & Rodack, LLP

(57) ABSTRACT

Various embodiments are disclosed for image editing. A frame is obtained from a frame sequence depicting at least one individual, and facial characteristics in the frame are analyzed. A utilization score is assigned to the frame based on the detected facial characteristics, and a determination of whether to utilize the frame is made based on the utilization score. A completeness value is assigned, and a determination is made based on the completeness value of whether to repeat the steps above for an additional frame in the frame sequence based on the completeness value. Regions from the frames are combined to generate a composite image.

27 Claims, 10 Drawing Sheets

SYSTEMS AND METHODS FOR IMAGE EDITING

CROSS-REFERENCE TO RELATED APPLICATION

This application claims priority to, and the benefit of, U.S. Provisional patent application entitled, "Systems and Methods for Compositing," having Ser. No. 61/835,726, filed on Jun. 17, 2013, which is incorporated by reference in its entirety.

BACKGROUND

With the ever-growing amount of digital content available to consumers through the Internet and other sources, consumers have access to a vast amount of content. With existing media editing tools, users manually edit digital photos to achieve a desired effect or style. This typically involves a great deal of effort on the part of the user in order to emphasize or convey the context of the media content being viewed. Thus, while many media editing tools are readily available, the editing process can be tedious and time-consuming.

SUMMARY

Briefly described, one embodiment, among others, is a method for editing images in a frame sequence. The method comprises the operations of: (a) obtaining, by an image editing system, a frame from the frame sequence depicting at least one individual; (b) detecting, by the image editing system, a presence of at least one face region in the frame; (c) detecting, by the image editing system, a presence of at least one smile in the frame; and (d) detecting the presence of at least one set of blinking eyes in the frame. The method further comprises (e) assigning a utilization score based on the detection of smiles and the detection of blinking eyes and (f) determining whether to utilize the frame based on the utilization score. The method further comprises (g) assigning a completeness value and determining whether to repeat steps (a)-(g) for an additional frame in the frame sequence based on the completeness value. The method further comprises combining the face regions from the frames to generate a composite image.

Another embodiment is a system for editing images in a frame sequence, comprising a processor and at least one application executable in the processor. The at least one application comprises a media interface for obtaining a frame from the frame sequence depicting at least one individual, a content analyzer for detecting a presence of at least one face region and facial characteristics of the at least one face region in the frame, and a utilization scorer for assigning a utilization score based on the detected facial characteristics. The at least one application further comprises a frame utilizer for determining whether to utilize the frame based on the utilization score and a completeness evaluator for assigning a completeness value to the operation of obtaining the frame by the media interface and for determining whether to instruct the media interface to obtain an additional frame from the frame sequence based on the completeness value. The at least one application further comprises a combiner for combining the face regions from the frames to generate a composite image.

Another embodiment is a non-transitory computer-readable medium embodying a program executable in a computing device. The program comprises code that obtains a frame from a frame sequence depicting at least one individual, code that detects a presence of at least one face region and facial characteristics of the at least one face region in the frame, and code that assigns a utilization score based on the detected facial characteristics. The program further comprises code that determines whether to utilize the frame based on the utilization score, and code that assigns a completeness value to the operation of obtaining the frame by the code that obtains the frame and for determining whether to instruct the code that obtains the frame to obtain an additional frame from the frame sequence based on the completeness value. The program further comprises code that combines the face regions from the frames to generate a composite image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

It can be a challenge to take a group photo where every person within the photo smiles and where no one is blinking. A photographer typically asks the individuals to say "cheese" in order to encourage everyone to smile for the camera and to provide a cue that the photographer about to take a picture. Even so, as the number of people within the picture increases, it can be challenging to take a "perfect" group photo with everybody looking at the camera and smiling at the same time. Many times, one or more people in the picture (particularly, young children) are either not looking at the camera or are blinking. Various embodiments are disclosed for generating composite images whereby elements or swap regions from a series of images are scored and combined into a single image based on the respective scoring values to generate a composite photo where all the individuals are looking at the camera and smiling.

For purposes of this disclosure, the completeness value represents the degree in which the image compositing process is completed. For example, the system may utilize the completeness value to determine whether further compositing operations are needed in order to generate a better quality composite image. The utilization score indicates whether a particular frame is a good candidate for purposes of performing image compositing. The goodness value indicates how suitable a particular candidate region is for being inserted in place of a region to be swapped. The confidence level indicates the likelihood in which a particular facial attribute is present within a particular frame. For example, the confidence level may represent the likelihood that a particular frame contains a smile or blinking eyes. The distortion possibility value indicates the likelihood that a resulting composite image contains some degree of distortion resulting from replacement of a region with another region.

Figure 1A:
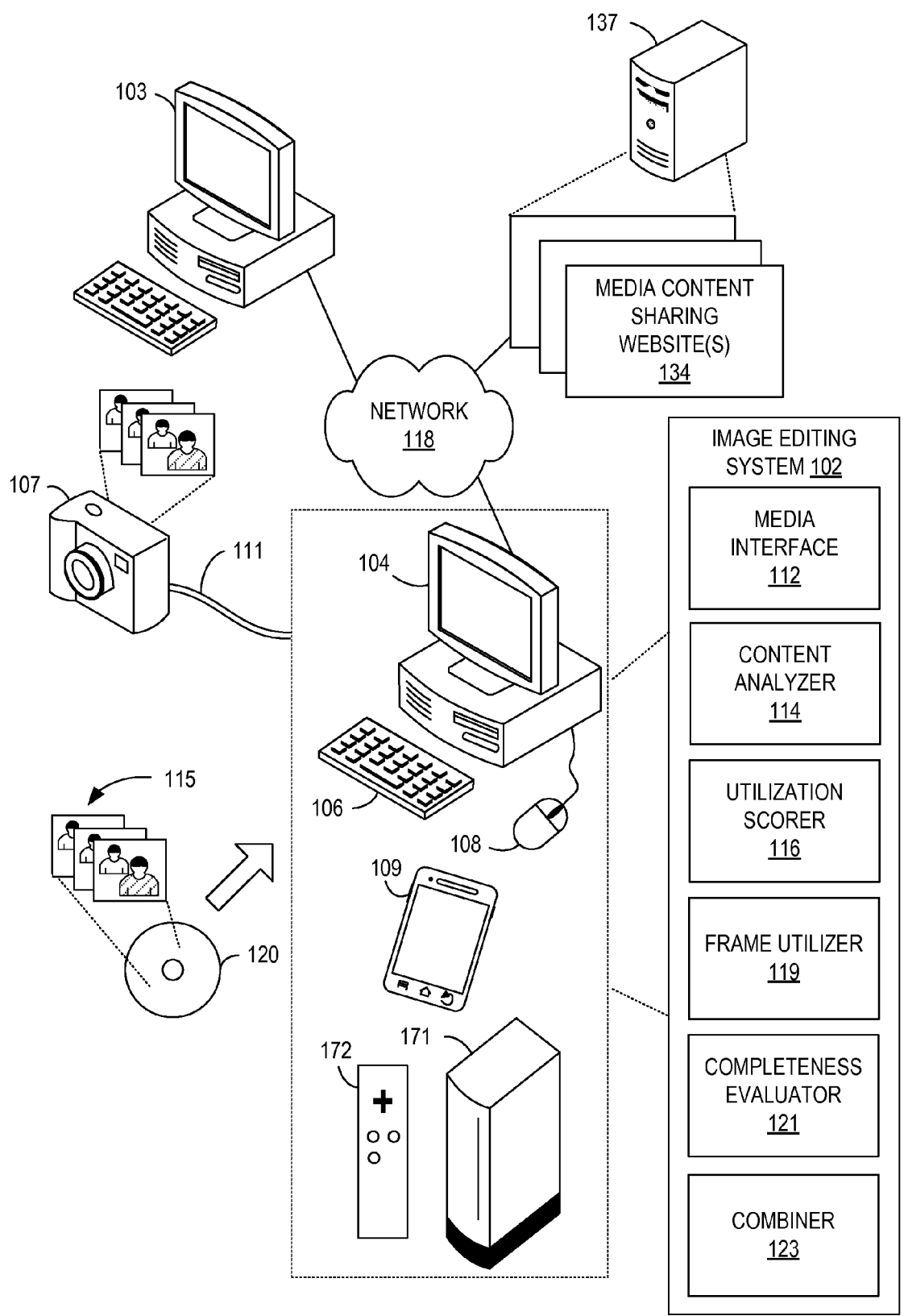
FIG. 1A is a block diagram of an image editing system for facilitating image editing to generate a composite image in accordance with various embodiments of the present disclosure.

A description of a system for automatically compositing swap regions from a series of digital photos to generate a composite photo is now described followed by a discussion of the operation of the components within the system. FIG. 1A is a block diagram of an image editing system 102 in which embodiments of the techniques for image editing may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via a media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

The digital media content 115 may be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1A, the media interface 112 in the image editing system 102 may also be configured to retrieve digital media content 115 directly from a digital recording device 107 where a cable 111 or some other interface may be used for coupling the digital recording device 107 to the image editing system 102. The image editing system 102 may support any one of a number of common computer interfaces, such as, but not limited to IEEE-1394 High Performance Serial Bus (Firewire), USB, a serial connection, and a parallel connection.

The digital recording device 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more media content sharing websites 134 hosted on a server 137 via the network 118 to retrieve digital media content 115.

The components executed on the image editing system 102 include a content analyzer 114, a utilization scorer 116, a frame utilizer 119, a completeness evaluator 121, a combiner 123, and other applications, services, processes, systems, engines, or functionality not discussed in detail herein. The content analyzer 114 is executed to analyze the characteristics of individuals depicted within the media content received by the media interface 112, where the characteristics may comprise, for example, facial expressions (e.g., smile) of individuals. For some embodiments, a graphical element such as a star icon or heart icon may be displayed in response to detecting certain facial expressions (e.g., smile) of individuals. For some embodiments, a graphical element may be displayed in response to detecting an absence of certain facial expressions (e.g., blinking eyes) of individuals. For some embodiments, the appearance of the graphical element may vary based on the completeness value. Furthermore, for some embodiments, a separate graphical element such as a progress bar may be displayed showing the percentage of the compositing process completed.

The utilization scorer 116 is executed to assign a utilization score to each photo obtained by the media interface 112 based on the analysis performed by the content analyzer 114. As discussed above, the utilization score indicates whether a particular frame or photo is a good candidate for purposes of performing image compositing. For some embodiments, the utilization scorer 116 assigns the utilization score based on the utilization score having a negative correlation with the number of blinking eyes. The utilization scorer 116 also assigns the utilization score based on the utilization score having a positive correlation with the number of smiles. Thus, a higher number of smiles results in a higher utilization score being assigned by the utilization score 116. The frame utilizer 119 is executed to determine whether to utilize a particular photo for compositing purposes based on the utilization score.

The completeness evaluator 121 is executed to determine whether additional photos or samples need to be obtained by the media interface 112. For example, the completeness evaluator 121 may determine that there are insufficient swap regions for generating a composite photo where all the individuals are looking at the camera and where all the individuals are smiling. In these scenarios, the completeness evaluator 121 instructs the media interface 112 to obtain additional photos.

The combiner 123 is executed to composite swap regions from photos identified by the frame utilizer 119 to generate a resulting image with the desired effect (e.g., where all the individuals are looking at the camera and where all the individuals are smiling).

Figure 1B:
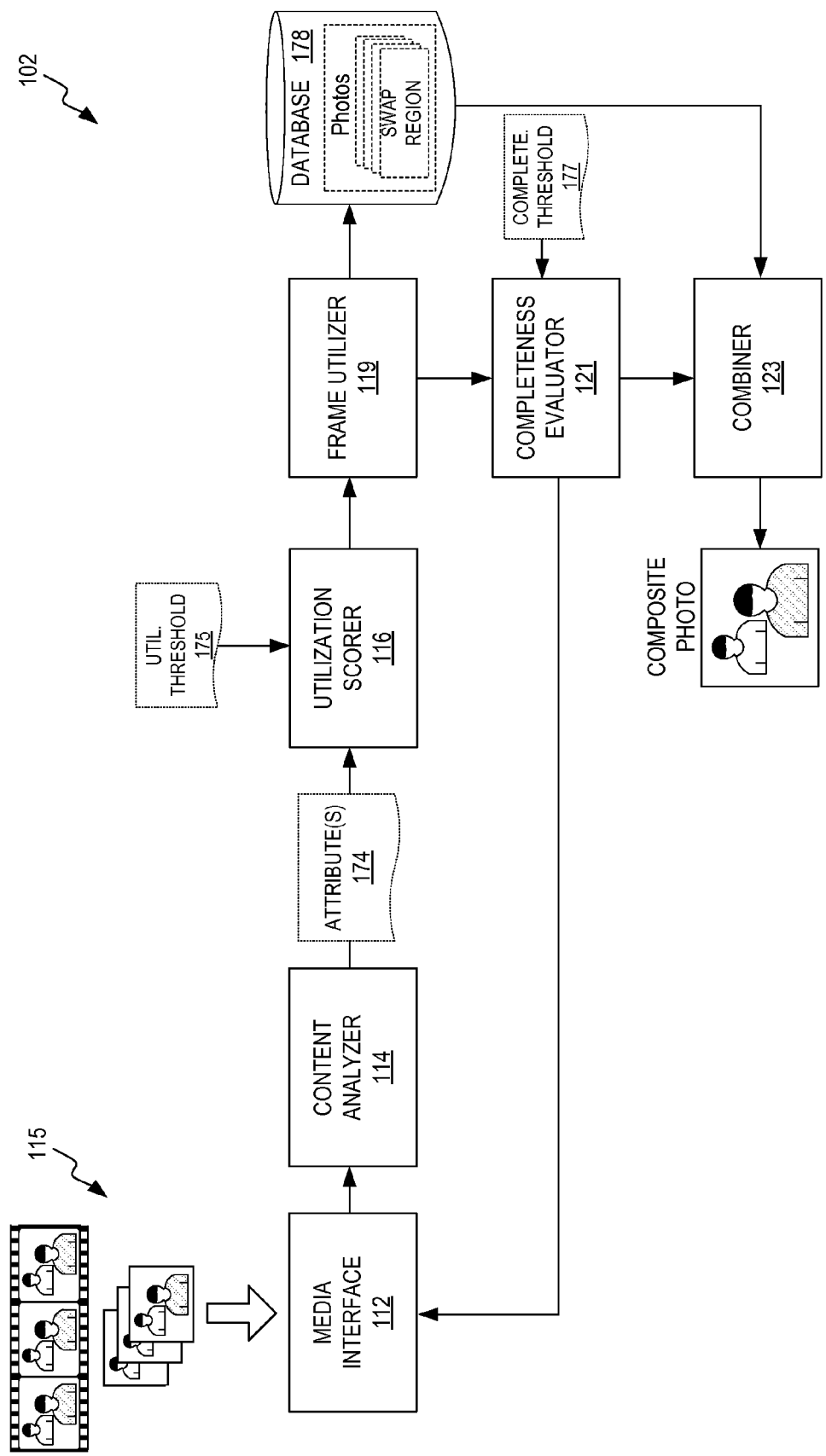
FIG. 1B illustrates the process flow between various components of the image editing system of FIG. 1A in accordance with various embodiments of the present disclosure.

Having described various components of the image editing system 102, the process flow between the various components is now described in more detail. Reference is made to FIG. 1B, which illustrates various components of the image editing system 102 in FIG. 1A. To begin, the media interface 112 obtains media content 115 depicting one or more individuals, where the media content may comprise, for example, a series of digital photos captured by a digital recording device 107 (FIG. 1A). The media content 115 may also comprise a series of frames from a video sequence captured by the digital recording device 107.

Figure 3:
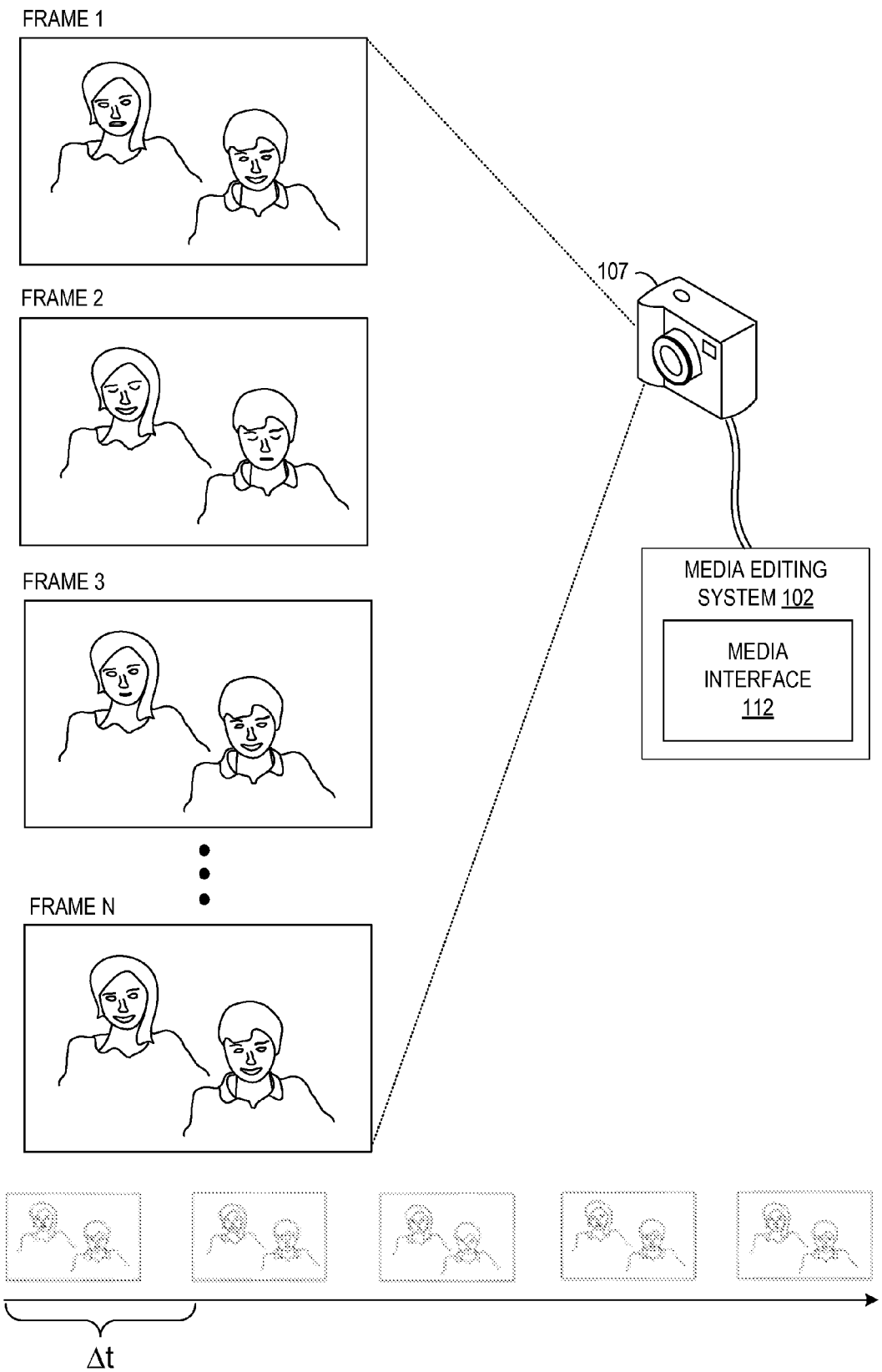
FIG. 3 illustrates operation of the media interface of the image editing system of FIG. 1A in accordance with various embodiments of the present disclosure.

To further illustrate retrieval of a series of frames, reference is made to FIG. 3. For some embodiments, the media interface 112 initially obtains a predetermined number of samples comprising digital photos or video frames. The media interface 112 then forwards, on a frame-by-frame basis, the media content 115 to the content analyzer 114, where the content analyzer 114 analyzes characteristics of the media content 115. The predetermined number of samples that the media interface 112 obtains may be a function of the amount of time between the photos or frames. For example, if the media interface 112 is coupled to a digital recording device 107 set to capture a burst of five images approximately 1 second apart, the media interface 112 may be configured to obtain five images at a time from the digital recording device 107. On the other hand, if the digital recording device 107 is configured to capture video at 30 frames per second, the media interface 112 may be configured to obtain 90 samples, given the relatively short amount of time between photos.

Referring back to FIG. 1B, the content analyzer 114 detects the presence of individuals and identifies facial characteristics of the individuals. In particular, the content analyzer 114 determines whether one or more individuals in each sample are smiling and whether one or more individuals in each sample are blinking. Based on whether the content analyzer 114 detects the presence of multiple target attributes 174 for each individual (e.g., where an individual is smiling and/or looking at the camera), the content analyzer 114 assigns an overall score to the sample. Thus, a photo where two of three individuals are smiling and where all the individuals are looking at the camera will be assigned a higher utilization score than a photo where only one of three individuals is smiling and where two of the individuals are blinking.

Figure 4:
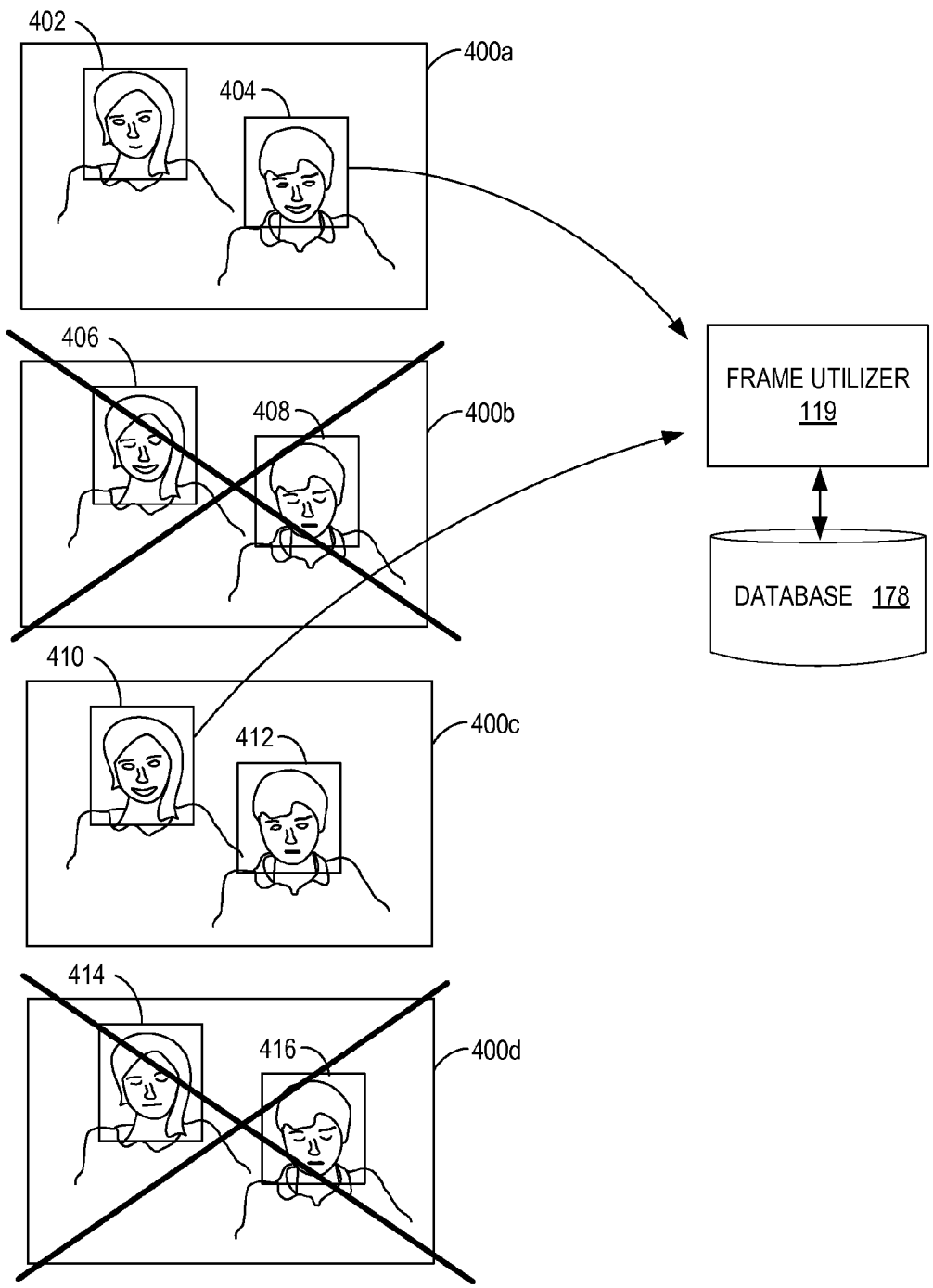
FIG. 4 illustrates operation of the frame utilizer of the image editing system of FIG. 1A in accordance with various embodiments of the present disclosure.

To further illustrate, reference is made to FIG. 4, which depicts a series of digital photos 400a, 400b, 400c, 400d obtained by the media interface 112 (FIG. 1B). The content analyzer 114 (FIG. 1B) analyzes the facial regions within each digital photo 400a, 400b, 400c, 400d. For example, in the first digital photo 400a, the content analyzer 114 determines whether any of the facial regions 402, 404 depict a smiling individual. The content analyzer 114 also determines whether any of the facial regions 402, 404 within the digital photo 400a depict an individual who is blinking. Similarly, the content analyzer 114 analyzes the facial regions 406, 408, 410, 412, 414, 416 in the other digital photos 400b, 400c, 400d.

The frame utilizer 119 then determines whether to utilize a digital photo 400a for compositing purposes based on the analysis performed by the content analyzer 114. For some embodiments, the frame utilizer 119 assigns a score to each digital photo 400a, 400b, 400c, 400d for each of a predetermined list of target attributes (e.g., a smile). Furthermore, the frame utilizer 119 may assign higher weighting for some attributes than others. For example, the presence of a smiling individual within a photo may be assigned a higher score than the presence of an individual looking at the camera (i.e., whether the individual is not blinking).

The frame utilizer 119 determines whether to utilize a particular digital photo 400a, 400b, 400c, 400d based on the cumulative utilization score for each digital photo 400a, 400b, 400c, 400d. In the example shown in FIG. 4, the frame utilizer 119 determines that the cumulative utilization score of digital photos 400a, 400c meet or exceed a utilization threshold. Therefore, the frame utilizer 119 stores the digital photos 400a, 400c for compositing purposes. For some embodiments, the frame utilizer 119 stores the digital photos 400a, 400c in a database 178 maintained within the image editing system 102 (FIG. 1A).

In addition to storing the digital photos 400a, 400c, the frame utilizer 119 may also be configured to tag facial regions 402, 404, 410, 412 with a high utilization score as candidate swap regions for compositing purposes. For example, as shown in FIG. 4, facial region 404 in digital photo 400a and facial region 410 in digital photo 400c may both be identified as candidate swap regions because the individuals are both smiling and looking at the camera.

In the example shown, the cumulative utilization scores of the remaining digital photos 400b, 400c do not meet the utilization threshold. Therefore, the frame utilizer 119 does not utilize these digital photos 400b, 400c. For some embodiments, the frame utilizer 119 may delete the digital photos 400b, 400c to free up storage space.

Referring back to FIG. 1B, the frame utilizer 119 notifies the completeness evaluator 121 upon identifying digital photos that meet or exceed the utilization threshold. The completeness evaluator 121 then determines whether a suitable number of samples are available for compositing purposes. For example, if the content analyzer 114 determines that four individuals are depicted in the digital photos, the completeness evaluator 121 may be configured to examine the digital photos stored in the database 178 by the frame utilizer 119 and determine whether there is at least one suitable swap region available for each of the four individuals. For example, the completeness evaluator 121 may access the database 178 to determine whether there are swap regions depicting a smile and/or non-blinking eyes for each of the individuals.

The completeness evaluator 121 assigns a completeness value to the sample-retrieval operation performed by the media interface 112 based on the content of the database 178. If the completeness value does not meet or exceed a completeness threshold 177, the completeness evaluator 121 instructs the media interface 112 to obtain additional media content 115 from the digital recording device 107, storage medium 120 (FIG. 1A), etc. For some embodiments, the image editing system 102 processes media content 115 on a frame-by-frame basis.

If the completeness value meets or exceeds the completeness threshold 177, the completeness evaluator 121 notifies the combiner 123 that a suitable number of candidate swap regions are available in the database 178 for purposes of compositing a photo with the desired effect (e.g., where all the individuals are smiling and all the individuals are looking at the camera).

Figure 5:
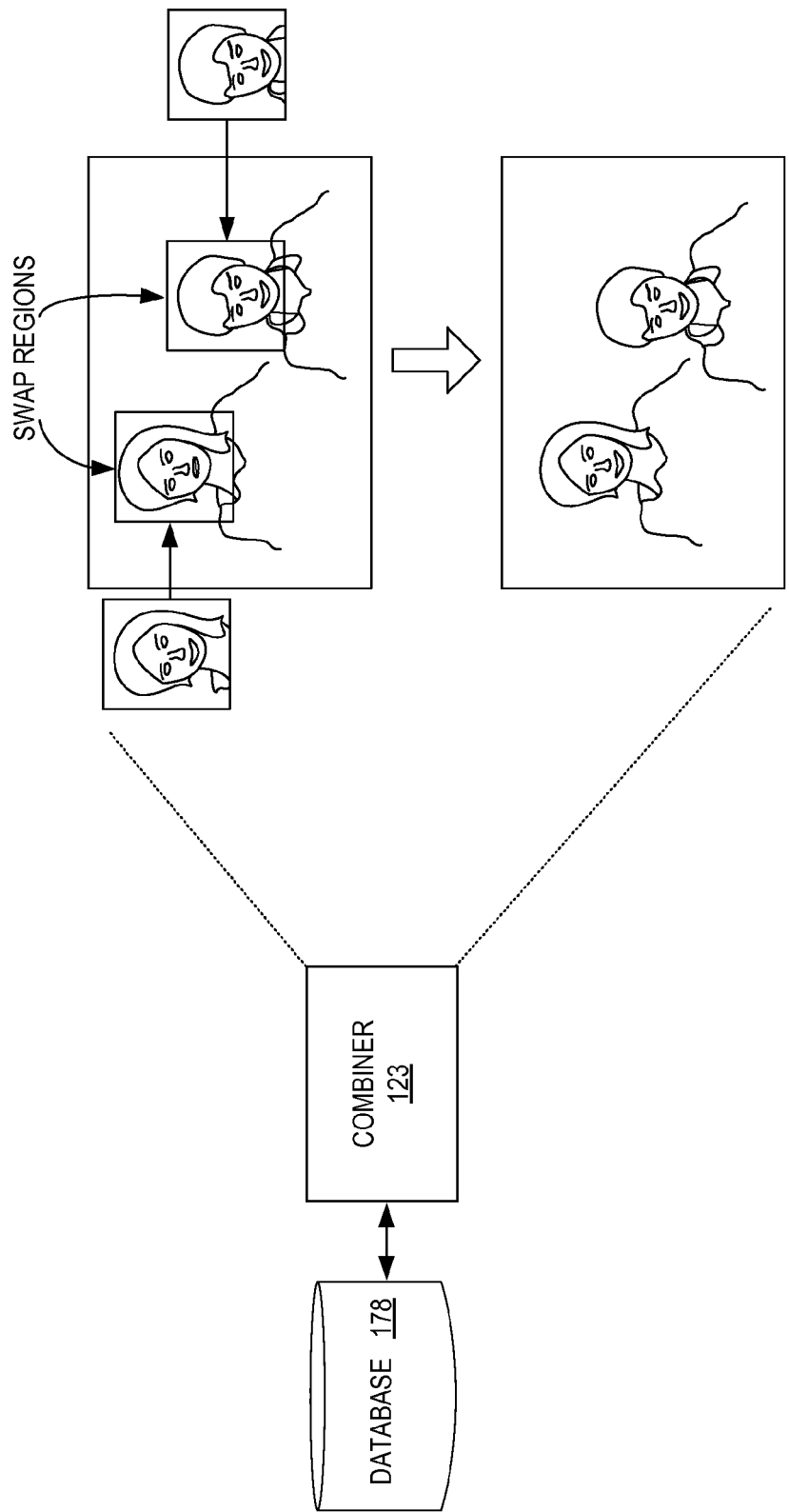
FIG. 5 illustrates operation of the combiner of the image editing system of FIG. 1A in accordance with various embodiments of the present disclosure.

To further illustrate the compositing process performed by the combiner 123, reference is made to FIG. 5. In accordance with some embodiments, the combiner 123 selects one of the digital photos 400a, 400c (FIG. 4) identified by the frame utilizer 119 (FIG. 1A) and stored in the database 178 as a base photo for compositing purposes, where selection of the base photo is based on a corresponding utilization score for each digital photo 400a, 400c. For some embodiments, the combiner 123 may designate a base photo by selecting the digital photo that already exhibits most of the desired attributes (e.g., the digital photo that depicts the most number of individuals smiling and looking at the camera).

The combiner 123 accesses the database 178 to retrieve candidate region(s) exhibiting the desired attributes for purposes of inserting the candidate region(s) in place of a swap region in the base frame. For some embodiments, the candidate region(s) are retrieved by the combiner 123 based on a corresponding goodness value assigned by the combiner 123 to each candidate region(s) stored in the database 178. Note that in some instances, it is possible that the frame utilizer 119 has identified multiple swap regions depicting the same desired attribute for a particular individual.

For some embodiments, the goodness value is assigned by determining a distortion possibility value based on the relationship between the candidate region(s) and the region to be swapped, where the goodness value has a negative correlation with the distortion possibility value. As discussed above, the distortion possibility value indicates the likelihood that a resulting composite image contains some degree of distortion resulting from replacement of a region with another region. The distortion value may be calculated based on the distance between the center of each candidate region to the center of the region to be swapped, where a lower distortion value is assigned for lower distance values.

For some embodiments, the distortion possibility value is determined by determining a refined candidate face region from a candidate face region by comparing the pixel values around the candidate face region with pixel values around the face region to be swapped. The distortion possibility value is then determined based on the comparison result of the pixel values around the candidate face region and pixels around the face region to be swapped. For some embodiments, the pixels values may correspond to a contour around the refined candidate face region and a contour of the face region to be swapped.

To illustrate, reference is made back to FIG. 4. In the example shown, facial region 402 and facial region 410 both exhibit the individual smiling and looking at the camera. Thus, in accordance with some embodiments, the combiner 123 may obtain a first grouping of candidate regions from the database 178 and then extract a second grouping among the first grouping to ensure that the content of the candidate regions in the second grouping do not overlap. For example, as shown in FIG. 4, while facial region 402 and facial region 410 both depict the individual smiling, facial region 410 shows a bigger smile. The combiner 123 therefore selects facial region 410 as part of the second grouping and designates the facial region 410 as a target region to be inserted in place of the swap region of the base photo.

For some embodiments, multiple candidate regions may be combined to form a target region, where a base region among candidate regions is selected and other selected candidate regions are combined with the base region to generate the target region. Upon selecting of the second grouping, the combiner 123 inserts the target region(s) in place of the swap region(s) of the base photo to generate a resulting photo with the desired effect. For some embodiments, the combiner 123 refines the target region(s) in the corresponding photo based on the content of both the base frame and the frame(s) corresponding to the target region(s) to facilitate seamless insertion of the target region(s) in place of the swap region(s) of the base photo.

Figure 8:
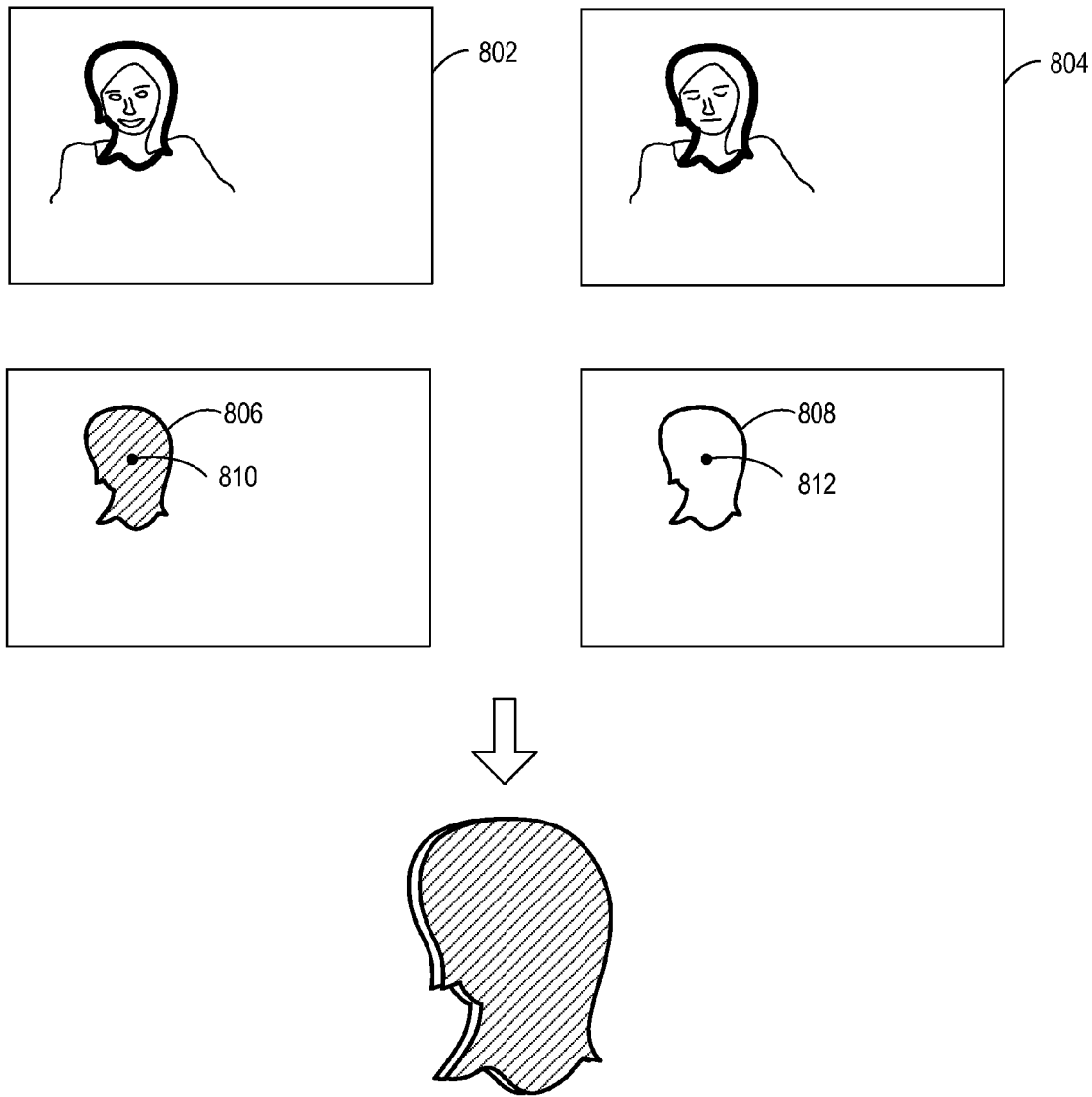
FIG. 8 illustrates the refinement process used in inserting a target region in place of a swap region according to various embodiments of the present disclosure.

A refinement algorithm performed by the combiner 123 is now described in connection with FIG. 8. Suppose, for purposes of illustration, that a first frame 802 contains a target region 806 and that another frame 804 contains a swap region 808, where the target region 806 is to be inserted in place of the swap region 808 to generate a composite image. For some embodiments, a refinement algorithm is executed by the combiner 123 to ensure seamless insertion of the target region 806 into the swap region 806. In the algorithm, respective center points 810, 812 are first identified within the target region 806 and the swap region 806. Second, the target region 806 is at least partially overlaid on top of the swap region 808 by aligning the respective center points 810, 812. In some instances, the two regions 806, 808 may be substantially aligned while in other instances, the two regions 806, 808 are only partially aligned. Furthermore, the refinement process is not limited to aligning the centers 810, 812 and other means of overlaying the two regions 806, 808 may be implemented.

Another technique for overlaying the target region and the swap region involves the use of feature points. For some embodiments, feature points are selected in frames 802, 804. Note that feature points are not limited to points within the target region 806 and the swap region 808 as any point(s) within the respective frames 802, 804 may be selected for alignment purposes. For some embodiments, the feature points may be selected according to color information or texture data within the frames 802, 804. For some embodiments, the feature points may be selected according to saliency regions within the frames 802, 804 (e.g., a feature point within a particular facial feature region).

Figure 9:
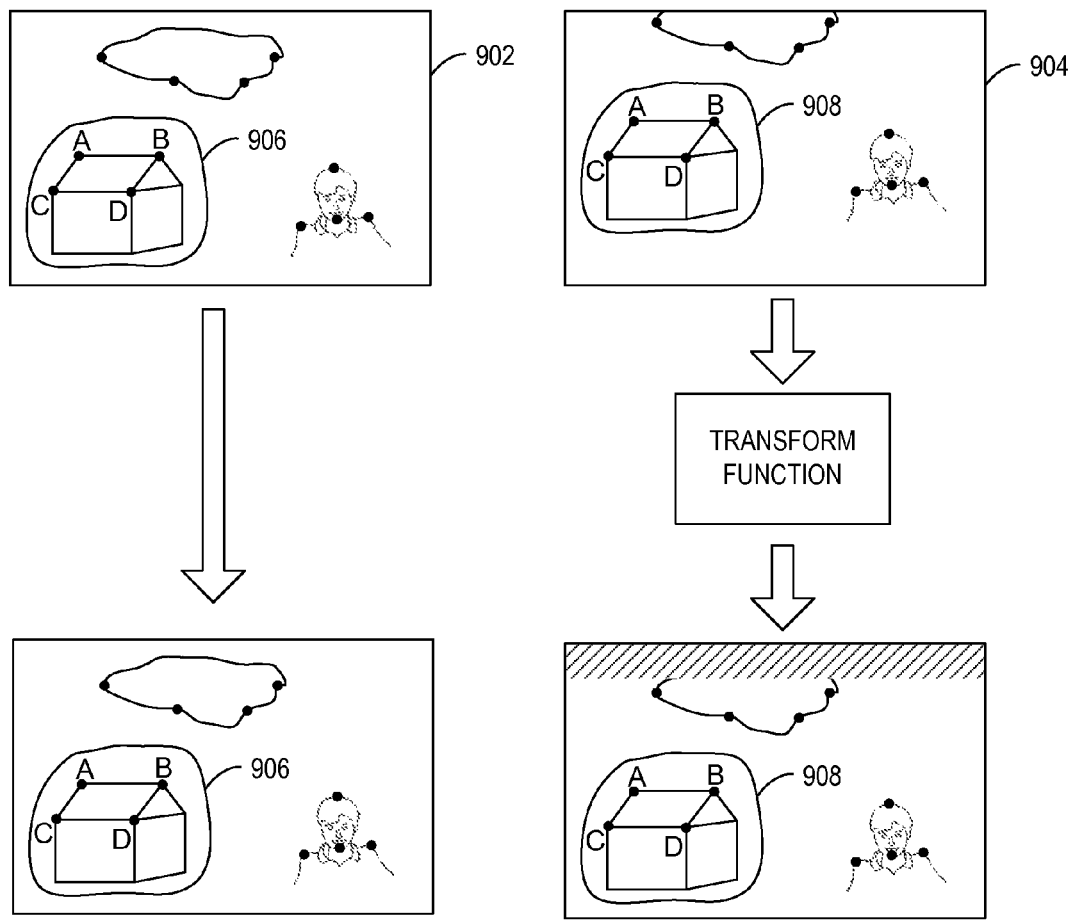
FIG. 9 illustrates a transform function applied to content in a frame for purposes of aligning feature points according to various embodiments of the present disclosure.

Next, a transform function is determined for aligning the two frames by aligning corresponding feature points. For some embodiments, the transform function comprises moving the selected feature points by moving the corresponding frame 802, 804 in an upward direction, a downward direction, to the left, to the right, and so on. The transform function may also comprise rotating the entire frame 802, 804, zooming in, or zooming out on the target region 806. The transform function is applied to move the feature points until the feature points in the two frames 802, 804 are substantially aligned. To further illustrate, reference is made to FIG. 9, which illustrates a transform operation to content in a frame for purposes of aligning feature points.

Suppose, for purposes of illustration, that a first frame 902 contains a target region 906 and that another frame 904 contains a swap region 908, where the target region 906 is to be inserted in place of the swap region 908 to generate a composite image. In this example, feature points A, B, C, and D are selected from both frames 902, 904. In frame 904, the swap region 908 is offset in an upward direction relative to the target region 906 in frame 902. A transform operation is therefore applied to frame 904 to move the feature points A, B, C, D in a downward direction in order to roughly align the feature points A, B, C, D of the two frames 902, 904 in order to seamlessly insert the target region 906 in place of the swap region 908.

Various algorithms may be applied for aligning the feature points to determine a minimum difference for a group of feature points. A contour region is then determined by calculating a sum of difference between the two regions. A minimum modification region is determined in the swap region 808 for the contour region. For some embodiments, a contour is determined based on a region of interest. For some embodiments, multiple contour regions may be determined as part of the refinement process. Such contour regions may correspond to a region containing eyes that are closed, a region containing a frown, and so on. Specifically, the contour is determined based on a minimum difference of the pixels between the two regions 806, 808, where the contour region is large enough to cover the swap region. The target region 806 is then inserted in place of the swap region 808 based on the determined contour.

Figure 2:
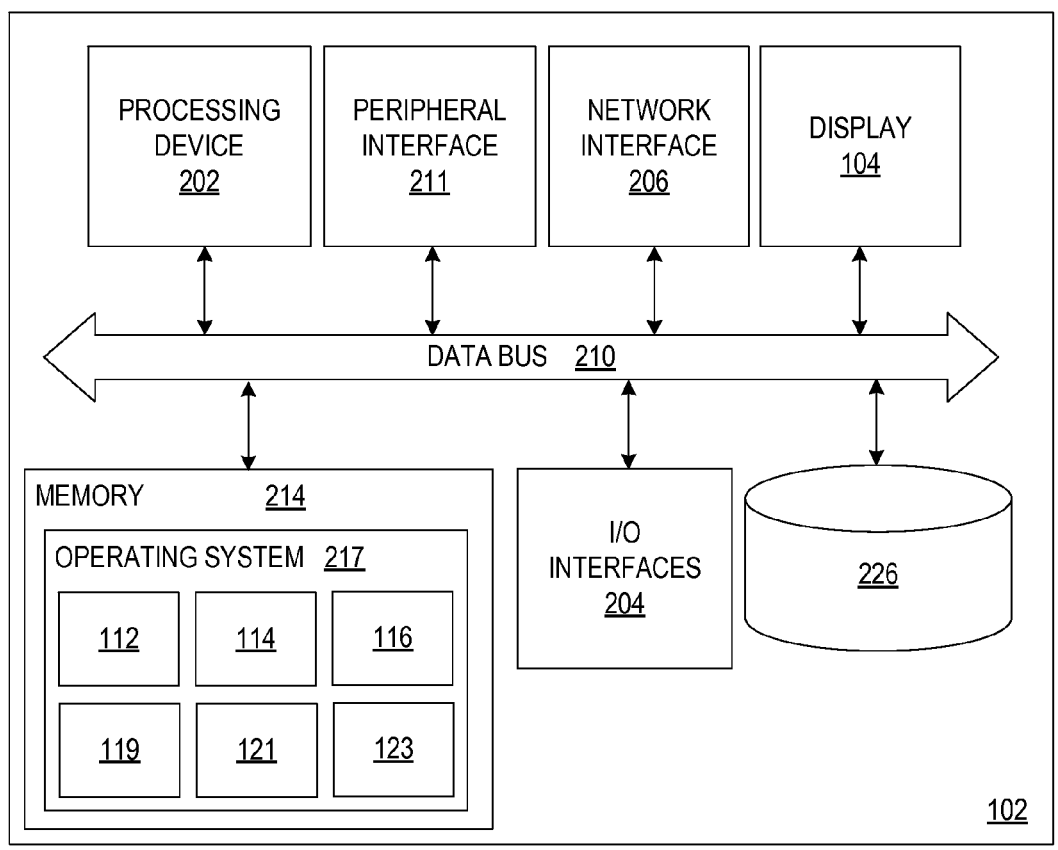
FIG. 2 is a detailed view of the image editing system of FIG. 1A in accordance with various embodiments of the present disclosure.

FIG. 2 is a schematic diagram of the image editing system 102 shown in FIG. 1A. The image editing system 102 may be embodied in any one of a wide variety of wired and/or wireless computing devices, such as a desktop computer, portable computer, dedicated server computer, multiprocessor computing device, smartphone 109 (FIG. 1A), tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, content analyzer 114, utilization scorer 116, frame utilizer 119, completeness evaluator 121, combiner 123) of the image editing system 102 depicted in FIG. 1A. In accordance with such embodiments, the components are stored in memory 214 and executed by the processing device 202. One of ordinary skill in the art will appreciate that the memory 214 can, and typically will, comprise other components which have been omitted for purposes of brevity.

In this regard, the term "executable" may refer to a program file that is in a form that can ultimately be run by the processing device 202. Examples of executable programs may be, for example, a compiled program that can be translated into machine code in a format that can be loaded into a random access portion of the memory 214 and run by the processing device 202, source code that may be expressed in proper format such as object code that is capable of being loaded into a random access portion of the memory 214 and executed by the processing device 202, or source code that may be interpreted by another executable program to generate instructions in a random access portion of the memory 214 to be executed by the processing device 202, etc. An executable program may be stored in any portion or component of the memory 214 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1A) or a mouse 108 (FIG. 1A). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1A). The image editing system 102 may further comprise mass storage 226. The peripheral interface 211 supports various interfaces including, but not limited to IEEE-1394 High Performance Serial Bus (Firewire), USB, a serial connection, and a parallel connection.

Figure 6:
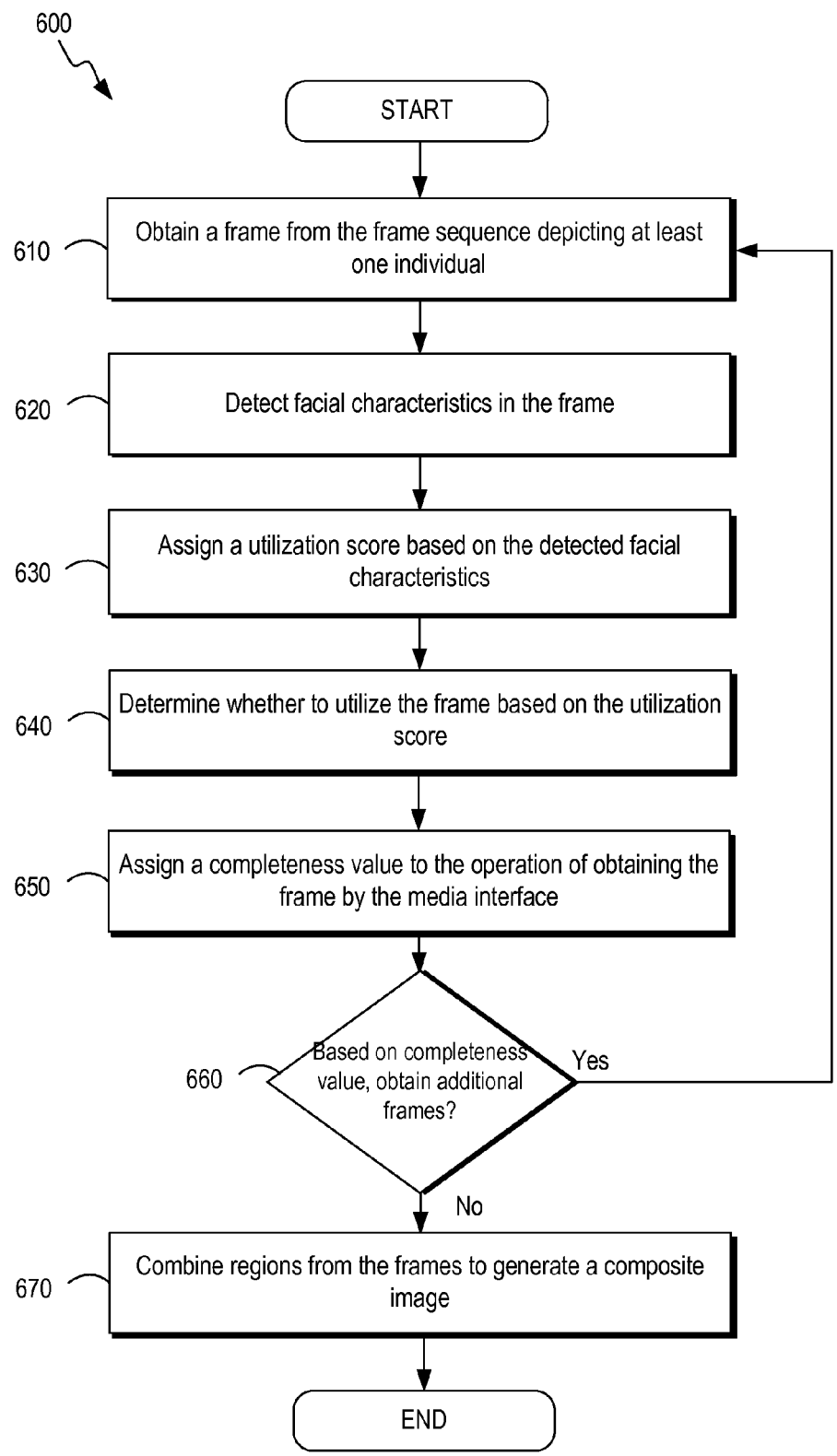
FIG. 6 is a top-level flowchart illustrating examples of functionality implemented as portions of the image editing system of FIG. 1A for facilitating compositing according to various embodiments of the present disclosure.

Reference is made to FIG. 6, which is a flowchart 600 in accordance with one embodiment for facilitating automatic media editing performed by the image editing system 102 of FIG. 1A. It is understood that the flowchart 600 of FIG. 6 provides merely an example of the many different types of functional arrangements that may be employed to implement the operation of the various components of the image editing system 102 (FIG. 1A). As an alternative, the flowchart of FIG. 6 may be viewed as depicting an example of steps of a method implemented in the image editing system 102 according to one or more embodiments.

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. It is understood that all such variations are within the scope of the present disclosure.

Beginning with block 610, the media interface 112 (FIG. 1A) obtains a frame from a frame sequence depicting at least one individual. As discussed earlier, the frame may comprise a digital photo from a series of digital photos or a frame from a video captured by a digital recording device 107 (FIG. 1A). In block 620, the content analyzer 114 (FIG. 1A) analyzes the facial characteristics of the frame. In block 630, the frame utilizer 119 assigns a utilization score based on the facial characteristics comprising, for example, the presence of smiles and the presence of non-blinking eyes. In block 640, the frame utilizer 119 determines whether to utilize the frame based on the assigned utilization score.

In block 650, the completeness evaluator 121 (FIG. 1A) assigns a completeness value based on whether a suitable number of samples are available for compositing purposes. In decision block 660, if the completeness value does not meet or exceed a completeness threshold 177 (FIG. 1B), then the process returns to block 610, and the completeness evaluator 121 instructs the media interface 112 to obtain another frame. If the completeness value meets or exceeds the completeness threshold 177, then the combiner 123 (FIG. 1A) combines regions from the frames identified by the frame utilizer 119 to generate a composite image.

Figure 7:
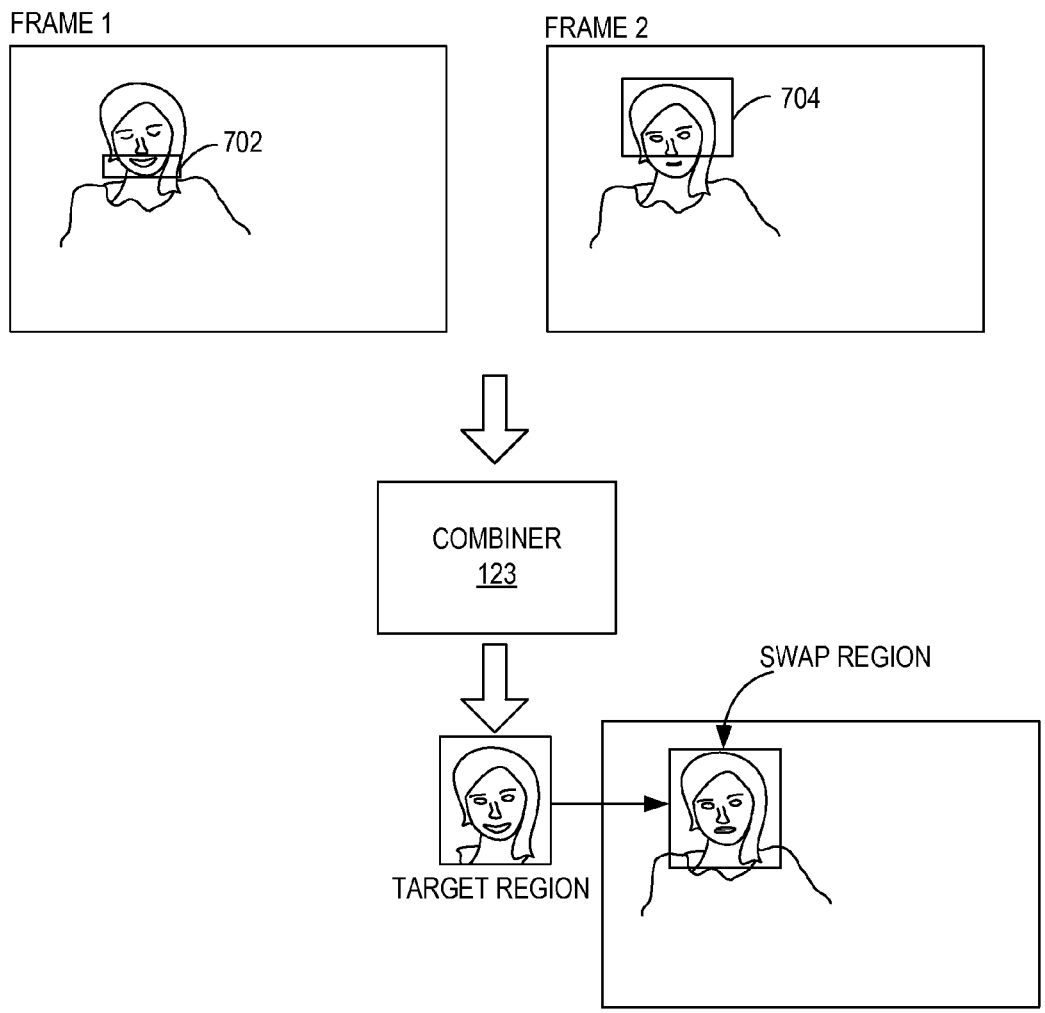
FIG. 7 illustrates operation of the combiner of the image editing system of FIG. 1A in accordance with an alternative embodiment of the present disclosure.

FIG. 7 illustrates an alternative embodiment of the compositing process performed by the combiner 123. In accordance with some embodiments, the combiner 123 accesses the database 178 (FIG. 1B) to retrieve one or more swap regions exhibiting the desired attributes. In the example shown, the combiner 123 retrieves candidate regions 702, 704 from different frames and combines the candidate regions 702, 704 to form a target region that is then inserted in place of the swap region of the base photo to generate a resulting photo with the desired effect.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for editing images in a frame sequence, comprising:
    (a) obtaining, by an image editing system, a frame from the frame sequence depicting at least one individual;
    (b) detecting, by the image editing system, a presence of at least one face region in the frame;
    (c) detecting, by the image editing system, a presence of at least one smile in the frame;
    (d) detecting, by the image editing system, a presence of at least one set of blinking eyes in the frame;
    (e) assigning a utilization score based on detection of smiles and detection of blinking eyes;
    (f) determining whether to utilize the frame based on the utilization score;
    (g) assigning a completeness value based on the frame and at least one previously-obtained frame;
    determining whether to repeat steps (a)-(g) for an additional frame in the frame sequence based on the completeness value; and
    combining the face regions from the utilized frames to generate a composite image, wherein steps (a)-(g) are repeated for an additional frame in the frame sequence in response to the completeness value being less than a completeness threshold, and wherein the completeness threshold decreases as a number of frames in the frame sequence increases.

2. The method of claim 1, wherein the face regions from the frames are combined in response to the completeness value meeting or exceeding the completeness threshold.

3. The method of claim 1, wherein assigning the utilization score comprises:
    assigning the utilization score based on the utilization score having a negative correlation with the number of blinking eyes; and
    assigning the utilization score based on the utilization score having a positive correlation with the number of smiles.

4. The method of claim 1, wherein combining regions from the utilized frames to generate the composite image comprises:
    selecting a base frame from the utilized frames based on the corresponding utilization score;
    determining a face region to be swapped in the base frame;
    determining a candidate face region from one of the other remaining frames in the frame sequence, wherein each of the candidate face regions corresponds to the face region to be swapped in the base frame;
    assigning a goodness value to each candidate face region based on detection of blinking eyes and detection of smiles;
    determining a target face region from among the candidate face regions based on the goodness value;
    refining the target face region in the corresponding frame based on the content of both the base frame and the corresponding frame; and
    replacing the face region to be swapped in the base frame with the refined target face region.

5. The method of claim 4, wherein the assigning the goodness value comprises:
    determining a confidence level based on the detection of smiles, wherein the confidence level corresponds to a likelihood that a smile has been detected; and
    assigning the goodness value based on the goodness value having a positive correlation with the confidence level.

6. The method of claim 4, wherein the assigning the goodness value comprises:
    determining a confidence level based on the detection of blinking eyes, wherein the confidence level corresponds to a likelihood that a set of blinking eyes has been detected; and
    assigning the goodness value based on the goodness value having a negative correlation with the confidence level.

7. The method of claim 4, wherein assigning the goodness value to each candidate face region based on detection of blinking eyes and detection of smiles comprises:
    determining a distortion possibility value based on a relationship between candidate face regions and the face region to be swapped; and
    assigning the goodness value based on the goodness value having a negative correlation with the distortion possibility value.

8. The method of claim 7, wherein the distortion possibility value is determined based on a distance between a center of each of the candidate face regions and a center of the region to be swapped.

9. The method of claim 8, wherein determining the distortion possibility value further comprises:
    determining a refined candidate face region from a candidate face region by comparing pixel values around the candidate face region with pixel values around the face region to be swapped; and assigning the distortion possibility value based on the comparison result of the pixel values around the candidate face region and the pixel values around the face region to be swapped.

10. The method of claim 9, wherein assigning the distortion possibility value is based on a pixel value difference between the contour of refined candidate face region and a corresponding contour of the face region to be swapped.

11. The method of claim 1, wherein combining regions from the utilized frames to generate the composite image comprises:
    selecting a base frame from the utilized frames based on the corresponding utilization score;
    determining a face region to be swapped in the base frame;
    determining a plurality of candidate face regions from a plurality of the other remaining frames in the frame sequence, wherein each of the candidate face regions corresponds to the region to be swapped in the base frame;
    extracting facial features from the candidate face regions;
    assigning a goodness value to each facial feature based on detection of blinking eyes and detection of smiles;
    selecting at least two facial features based on the goodness values;
    combining the selected facial features into a target face region, the target face region being incorporated from the at least two of the frames corresponding to the selected facial features;
    refining the target face region based on the content of both the base frame and the frame corresponding to the target face region; and
    replacing the face region to be swapped in the base frame with the refined target face region.

12. The method of claim 11, wherein the facial features comprise at least one of the following:
    an eye;
    a nose;
    a mouth; and
    a face contour.

13. The method of claim 11, wherein combining the selected candidate face regions into the target face region comprises:
    selecting one of the selected facial features as a base feature whose corresponding face region is a face region within the base frame; and
    combining other selected facial features with the base face region to generate a target face region.

14. The method of claim 13, wherein selecting one of the selected facial features as the base feature comprises selecting a selected facial feature with a highest goodness value as the base feature.

15. The method of claim 1, wherein determining whether to utilize the frame based on the utilization score comprises:
    setting a utilization threshold; and
    utilizing the frame if the utilization score is greater than or equal to the utilization threshold.

16. The method of claim 15, wherein the utilization threshold is decreased as a time period between frames of the frame sequence increases.

17. The method of claim 1, wherein assigning the completeness value to the obtaining step comprises:
    determining a total number of individuals in the frame;
    determining a number of smiling individuals in the frame; and
    computing a ratio of the number of smiling individuals to the total number of individuals.

18. The method of claim 17, further comprising displaying a graphical element in response to detecting the presence of at least one smile in the frame.

19. The method of claim 1, wherein assigning the completeness value to the obtaining step comprises:
    determining a total number of individuals in the frame;
    determining a number of non-blinking individuals in the frame; and
    computing a ratio of the number of non-blinking individuals to the total number of individuals.

20. The method of claim 19, further comprising displaying a graphical element in response to detecting an absence of any blinking eyes in the frame.

21. The method of claim 20, wherein an appearance of the graphical element varies based on the completeness value.

22. A system for editing images in a frame sequence, comprising:
    a processor; and
    at least one application executable in the processor, the at least one application comprising:
        a media interface for obtaining a frame from the frame sequence depicting at least one individual;
        a content analyzer for detecting a presence of at least one face region and facial characteristics of the least one face region in the frame;
        a utilization scorer for assigning a utilization score based on the detected facial characteristics;
        a frame utilizer for determining whether to utilize the frame based on the utilization score;
        a completeness evaluator for assigning a completeness value based on the frame and at least one previously-obtained frame, the completeness evaluator being further configured for determining whether to instruct the media interface to obtain an additional frame from the frame sequence based on the completeness value; and
        a combiner for combining the face regions from the frames to generate a composite image, wherein obtaining a frame, detecting the presence of at least one face region and facial characteristics, assigning the utilization score, determining whether to utilize the frame, and assigning the completeness value are repeated for an additional frame in the frame sequence in response to the completeness value being less than a completeness threshold, and wherein the completeness threshold decreases as a number of frames in the frame sequence increases.

23. The system of claim 22, wherein the regions from the frames are combined in response to the completeness value meeting or exceeding the completeness threshold.

24. The system of claim 22, wherein the combiner is further configured to:
    select a base frame from the utilized frames based on the corresponding utilization score;
    determine a face region to be swapped in the base frame;
    determine a candidate face region from one of the other remaining frames in the frame sequence, wherein each of the candidate face regions corresponds to the face region to be swapped in the base frame;
    assign a goodness value to each candidate face region based on detection of blinking eyes and detection of smiles;
    determine a target face region from among the candidate face regions based on the goodness value;
    refine the target face region in the corresponding frame based on the content of both the base frame and the corresponding frame; and replace the face region to be swapped in the base frame with the refined target face region.

25. A non-transitory computer-readable medium embodying a program executable in a computing device, comprising:
- code that obtains a frame from a frame sequence depicting at least one individual;
- code that detects a presence of at least one face region and facial characteristics of the least one face region in the frame;
- code that assigns a utilization score based on the detected facial characteristics;
- code that determines whether to utilize the frame based on the utilization score;
- code that assigns a completeness value based on the frame and at least one previously-obtained frame, wherein the code that assigns the completeness value is further configured for determining whether to instruct the code that obtains the frame to obtain an additional frame from the frame sequence based on the completeness value; and
- code that combines the face regions from the frames to generate a composite image, wherein obtaining a frame, detecting the presence of at least one face region and facial characteristics, assigning the utilization score, determining whether to utilize the frame, and assigning the completeness value are repeated for an additional frame in the frame sequence in response to the completeness value being less than a completeness threshold, and wherein the completeness threshold decreases as a number of frames in the frame sequence increases.

26. The non-transitory computer-readable medium of claim 25, wherein the code that combines face regions from the frames to generate the composite image further comprises:
- code that selects a base frame from the utilized frames based on the corresponding utilization score;
- code that determines a face region to be swapped in the base frame;
- code that determines a candidate face region from one of the other remaining frames in the frame sequence, wherein each of the candidate face regions corresponds to the face region to be swapped in the base frame;
- code that assigns a goodness value to each candidate face region based on detection of blinking eyes and detection of smiles;
- code that determines a target face region from among the candidate face regions based on the goodness value;
- code that refines the target face region in the corresponding frame based on the content of both the base frame and the corresponding frame; and
- code that replaces the face region to be swapped in the base frame with the refined target face region.

27. The non-transitory computer-readable medium of claim 25, wherein the code that combines regions from the frames to generate the composite image further comprises:
- code that selects a base frame from the utilized frames based on the corresponding utilization score;
- code that determines a face region to be swapped in the base frame;
- code that determines a plurality of candidate face regions from a plurality of the other remaining frames in the frame sequence, wherein each of the candidate face regions corresponds to the face region to be swapped in the base frame;
- code that extracts facial features from the candidate face regions;
- code that assigns a goodness value to each candidate face region based on detection of blinking eyes and detection of smiles;
- code that selects at least two facial features based on the goodness values;
- code that combines the selected facial features into a target face region, the target face region being incorporated from the at least two of the frames corresponding to the selected facial features;
- code that refines the target face region based on the content of both the base frame and the frame corresponding to the target face region; and
- code that replaces the face region to be swapped in the base frame with the refined target face region.

* * * * *